United States Patent [19]

Incorvia

[11] Patent Number: 4,759,908
[45] Date of Patent: Jul. 26, 1988

[54] POLYTHIOETHER CORROSION INHIBITION SYSTEM

[75] Inventor: Michael J. Incorvia, Houston, Tex.

[73] Assignee: Texaco Inc., White Plains, N.Y.

[21] Appl. No.: 914,902

[22] Filed: Oct. 3, 1986

[51] Int. Cl.$^4$ ............................................. C23F 11/00
[52] U.S. Cl. .......................................... 422/14; 422/16; 422/7; 422/12; 208/47; 210/696; 252/8.551; 252/8.555; 252/395; 252/396
[58] Field of Search ....................... 422/14, 16, 12, 7; 210/696, 698; 252/395, 396, 8.555, 8.551; 208/47

[56] References Cited

U.S. PATENT DOCUMENTS

| | | | |
|---|---|---|---|
| 3,337,458 | 8/1967 | Bauer et al. | 252/48.6 |
| 3,773,675 | 11/1973 | Meiss et al. | 252/395 |
| 4,495,336 | 1/1985 | Hausler et al. | 422/12 |
| 4,499,006 | 2/1985 | Valone et al. | 422/12 |
| 4,511,480 | 4/1985 | Outlaw et al. | 252/8.555 |
| 4,608,191 | 8/1986 | Wu | 422/12 |
| 4,664,193 | 5/1987 | Wu | 422/14 |

Primary Examiner—Kenneth M. Schor
Assistant Examiner—Lori-Ann Cody
Attorney, Agent, or Firm—Jack H. Park; Kenneth R. Priem; Harold J. Delhommer

[57] ABSTRACT

A series of water-dispersible and oil-dispersible corrosion inhibiting solutions are disclosed which contain a polythioether represented by the formula

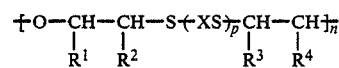

wherein $R^1$, $R^2$, $R^3$ and $R^4$ are H, a methyl group, or an ethyl group, X is a divalent organic radical selected from the group consisting of $-C_2H_4-$, $-C_4H_8-$, $-C_2C_4OC_2H_4-$, and $C_2H_4SC_2H_4-$, n is about 2 to about 40, and p is 0 or 1. The corrosion inhibitor solvent is preferably a hydrocarbon, such as an aromatic solvent or an alcohol, but may be water. Metal equipment can be protected through the use of the invention corrosion inhibiting solutions by contacting metal with an effective amount of inhibiting solution containing the polythioethers in a continuous exposure or batch treatment.

10 Claims, No Drawings

POLYTHIOETHER CORROSION INHIBITION SYSTEM

BACKGROUND OF THE INVENTION

This invention relates to organic inhibitor treating solutions employed to reduce corrosion from harsh fluid environments. More particularly, the invention concerns treating solutions containing polythioethers.

Corrosion that occurs in an oil field environment is complex and tends to attack all manner of metal equipment above and below ground. The principle corrosive agents found in the well fluids include hydrogen sulfide, carbon dioxide, oxygen, organic acids and solubilized salts. These agents may be present individually or in combination with each other. Valves, fittings, tubing, pumps, precipitators, pipelines, sucker rods and other producing equipment are particularly susceptible. Deposits of rust, scale, corrosion by-products, paraffin and other substances create ideal environments for concentration cells. Carbon dioxide and hydrogen sulfide induced pitting is encouraged by such deposits. Acidic condensate that collects on metal tubing will also cause pitting. Extreme temperatures and pressures in downhole environments further accelerate corrosion.

Very often as oil fields mature and enhanced recovery methods such as water flooding are instituted, the concentration of hydrogen sulfide in the well fluids increases dramatically. This increase in concentration and its related effect on the extent of pitting corrosion may make older fields economically unattractive due to to excessive corrosion costs.

Various sulfur compounds have been employed for many years in corrosion inhibitor systems, either alone or in combination with other components of inhibitor systems, such as amines, amides, surfactants, various aromatic compounds, phosphorus compounds and solubilizers. Dithiolanes having a specified formula of RR'COR" are proposed in U.S. Pat. No. 2,912,386 as corrosion inhibitors for acid attack on steel. According to the patent, R is a univalent organic radical having a specified formula, R' is a divalent hydrocarbon radical of less than 8 carbon atoms, and R" is OH, NH$_2$, lower alkoxy or an alkali metal such as Na. The preferred additive is 5-(1,2-dithiolan-3-yl)pentanoic acid. U.S. Pat., No. 3,791,789 discloses dithiolium compounds as corrosion inhibitors. And U.S. Pat. No. 3,697,221 describes the use of thionium derivatives, especially quaternary derivatives of dithiole-3-thiones as corrosion inhibitors.

U.S. Pat. No. 2,474,603 describes the use of corrosion inhibition systems containing a mixture of a butyl mercaptan along with sulfur containing compounds such as sulfides. A discussion on the use of alkyl mercaptans is also contained in Travanelli, Zucchi, Gullini and Carssiti, "Inhibition of Acid Corrosion of Iron By Sulfur Organic Compounds", *Ninth International Congress on Metallic Corrosion*, p. 602-5 (1969).

An aliphatic dithiol of the formula HS(CH$_2$)$_n$X(CH$_2$)$_m$SH where X equals O, S or NH, and n and m equal 1–20, is disclosed in Chemical Abstracts 88:40725p. A lubricating oil additive with excellent antioxidant anticorrosion properties is disclosed in U.S. Pat. No. 4,188,297. This lubricating additive is the reaction product of olefins with sulfur and certain mercaptans wherein the reaction product contains a high percentage of sulfur, such as about 25% sulfur. U.S. Pat. No. 4,495,336 discloses the use of mercapto-polycarboxylic acids as corrosion inhibitors.

Hydroxy terminated polythioethers are disclosed as invention compounds in U.S. Pat. No. 4,366,307. The polythioethers are taught as being useful as elastomers, plasticizers, high temperature lubricants, non-curing sealants and a component in a fuel resistant coating for steel.

Other examples of sulfur containing corrosion inhibitors include thiophosphates disclosed in U.S. Pat. No. 3,984,203 and various combinations of amido, and mercapto or polymercapto groups described in U.S. Pat. No. 4,332,967. U.S. Pat. No. 4,350,600 discloses a corrosion inhibitor for high temperature and high pressure gas wells containing a dialkyl disulfide along with a relatively high molecular weight aliphatic amine.

SUMMARY OF THE INVENTION

A series of water-dispersible and oil-dispersible corrosion inhibiting solutions are disclosed which contain a polythioether represented by the formula

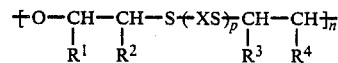

wherein R$^1$, R$^2$, R$^3$ and R4 are H, a methyl group, or an ethyl group, X is a divalent organic radical selected from the group consisting of —C$_2$H$_4$—, —C$_4$H$_8$—, —C$_2$C$_4$OC$_2$H$_4$—, and C$_2$H$_4$SC$_2$H$_4$—, n is about 2 to about 40, and p is 0 or 1. Preferably, the polythioether is hydroxyl-terminated. It has been discovered that the use of these polythioethers alone or the addition of the polythioethers to organic inhibitor systems reduces corrosion.

The corrosion inhibitor solvent is preferably a hydrocarbon, such as an aromatic solvent or an alcohol, but may be water. The polythioethers may be added to most organic inhibitor systems. They are especially effective in the presence of a fatty amine or a fatty ester in the inhibitor system.

Metal equipment can be protected through the use of the invention corrosion inhibiting solutions by contacting metal with an effective amount of inhibiting solution containing the polythioethers in a continuous exposure or batch treatment.

DETAILED DESCRIPTION

Perhaps the most costly problem in an oil field environment is corrosion of piping and equipment due to sweet and sour corrosion. It has been discovered that the addition of small amounts of a particular group of polythioethers effectively inhibits corrosion from both carbon dioxide and hydrogen sulfide.

The corrosion inhibiting solution of the invention contains about 10 ppm to about 10% by volume of the polythioethers in a solvent which may be water, brine, or a hydrocarbon. The polythioethers are preferably delivered to the corrosion sites in a continuous treating solution containing about 10 ppm to about 1% by volume, most preferably about 10 ppm to about 200 ppm of a polythioether having the formula

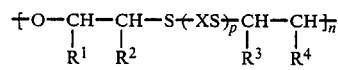

wherein $R^1$, $R^2$, $R^3$ and $R^4$ are H, a methyl group or an ethyl group, X is a divalent organic radical selected from the group consisting of $-C_2H_4-$, $-C_4H_8-$, $-C_2C_4OC_2H_4$, and $C_2H_4SC_2H_4-$, n is about 2 to about 40, and p is 0 or 1. The term polythioether as used herein is meant to refer to any compound satisfying this formula and definition.

Batch treatments of the polythioethers may also be employed. For batch treatments, the concentration of the polythioether should be about 1% to about 10% by volume. The polythioethers, however, can be stored and shipped in solutions with concentrations ranging up to 50% by volume. But at high concentrations, considerable settlement will occur, making it more difficult to accurately dilute the mixtures in the field.

For batch treatments the polythioether is preferably diluted in an aromatic or alcohol solvent with a filming additive such as a amine. Aromatic solvents are generally the most preferred solvents for batch filming purposes.

The polythioethers most preferred for use in the invention corrosion inhibiting solutions are those esters of the given formula wherein $R^1$, $R^2$, $R^3$ and $R^4$ are H or a methyl group and X is a $C_4H_8$ radical or a diethylether $(-C_2H_4OC_2H_4)$ radical. Synthesis methods are disclosed in U.S. Pat. No. 4,366,307, the entire disclosure of which is incorporated herein by reference.

The polythioethers are water insoluble except at very low concentrations below about 50 ppm. They are water-dispersible at low concentrations and oil-dispersible. Fatty esters, amines and surfactants can be used to increase water dispersibility. With some hydrocarbon solvents, they may be soluble. Thus, a wide range of solvents may be employed in the corrosion inhibiting system. The solvent may be water, brine, a hydrocarbon, or a hydrocarbon and brine mixture, most preferably, a hydrocarbon. Although the polythioethers may be dispersed in water at low concentrations, problems can result with additives such as fatty amines and fatty esters. Thus, hydrocarbon solvents are generally preferred. If the $R^1$, $R^2$, $R^3$ and $R^4$ groups of the polythioether are ethyl, or X is a divalent organic radical of a relatively high molecular weight, the polythioether will be difficult to disperse in water or alcohol solvents, as well as being more expensive to synthesize. It should be noted again that most organic inhibitors presently used in the oil field can be employed in the invention solution containing the polythioethers with improved corrosion results as long as the inhibitors are partially oil and water-dispersible.

An aromatic hydrocarbon solvent or a mixture of aromatic solvents is preferred for filming applications, while a low molecular weight hydrocarbon solvent is preferred when a system having greater water dispersibility is desired. The low molecular weight solvents are preferably methanol, ethanol, propanol, isopropanol, butanol, isobutanol, pentanol, ethylene glycol, propylene glycol, Texaco EM Fluid®, which is a trademarked mixture of ethylene glycol and monomethyl ether sold by Texaco Chemical Co, a mixture of alcohol and water, mixtures of the above alcohols, and similar compounds. The use of glycols or a mixture of glycol and an alcohol is preferred in cold environments because of the lower freezing point of the solvent when compared to cheaper lower molecular alcohols.

The polythioethers are especially effective when added to a corrosion inhibiting solution containing about 2 ppm to about 5% by volume of a amine, most preferably, a fatty amine. In most cases, the concentration will be in the range of about 10 ppm to about 1,000 ppm by volume. Some examples of these amines are diethylenetriamine, and tall oil diamines having about 16 to about 18 carbon atoms. A fatty amine having a total amine value of about 320–340 and an approximate molecular weight of about 170 sold under the trademark Sherex® 551 by Sherex Chemical Co. Inc. is especially effective.

Corrosion inhibition is also improved by the addition of about 2 ppm to about 5% by volume, preferably about 10 ppm to about 1000 ppm by volume, of a fatty ester to the inhibitor system. A preferred fatty ester is the ester sold under the trademark WITCO Kemester® 213 by WITCO Chemical Co. WITCO® 213 contains about 80% unsaturated $C_{18}$ in the fatty alkyl chain and has an approximate molecular weight of 290–300.

The polymeric backbone of the polythioether formula may be terminated with several types of terminating radicals, providing that the terminating radical does not substantially reduce the corrosion inhibiting properties of the compound. Mercaptan, epoxide, isocyanate, and hydrolyzable silyl-terminated radicals are all possible. Hydroxyl-terminated polythioethers are preferred.

It is desirable to store and transport the invention corrosion solution with higher concentrations of polythioether and organic inhibitor, such as about 1% to about 50% by volume. The polythioethers and preferred fatty amines and fatty esters are generally dispersible in water alone at the preferred treating concentrations of about 10 ppm to about 1%, and the batch treating concentrations of about 1% to about 10%. Of course, it is more difficult to disperse the longer chain polythioethers and fatty amines and fatty esters at higher concentrations. When higher concentrations are used for storage and transportation to save volume and shipping costs, the polythioethers are no longer water-dispersible and require some hydrocarbon solvent.

The corrosion inhibiting solutions of the invention which contain the instant polythioethers may be employed in different industries where metals come under attack. They are particularly effective in solving the corrosion problems which result from sweet and sour systems. Since the solutions offer substantial improvement over present inhibitor systems, they may be used to protect downhole piping and equipment in situations such as subsurface water injection for pressure maintenance, water disposal systems, or even drilling applications, as well as in above-ground, oil or water flow lines and equipment.

The invention solution may be employed in both general methods of inhibiting solution treatment, continuous injection and batch. However, in batch applications the thick filming formulation in an aromatic hydrocarbon solvent is preferred. Either method, continuous injection or batch, permits the organic inhibitor solution containing the polythioether to contact the metal to be protected and form an organic barrier over the metal.

The effectiveness of a given organic inhibitor system generally increases with the concentration, but because of cost considerations most solutions when fully diluted in their working environment must be effective in quantities less than about 0.01% by weight (100 ppm). The invention solution is believed effective throughout the range of about 10 ppm to about 200 ppm in a continuous injection method.

If a batch method is employed, a slug of inhibiting solution containing the polythioether should be injected into a closed system with a concentration of preferably about 1% to about 10% in the inhibiting solution. Of course, various surfactants, solubilizers and organic inhibitors may be added to the inhibiting solution to enhance its film-forming ability and effectiveness. The solution should be allowed to remain in contact with the metal to be protected for a sufficient time to form a durable film. The contact time period is preferably at least 12 hours, preferably 24 hours. Afterwards, normal production or flow of fluids should be resumed, flushing out excess inhibitor solution. The batch treatment should be repeated when necessary to maintain film durability over the metal to be protected.

At present, an industry established procedure for testing oil field corrosion inhibitors does not exist. Because of widely varying corrosion conditions in the oil field, it is impractical to establish a universal standard laboratory test. But it is desirable to have tests that are easily duplicated and can approximate the continuous type of liquid and gas exposure that occurs in wells and flow lines in the oil field. A continuous exposure wheel test has achieved some following in the industry. The continuous exposure procedure set forth in the January 1968 issue of "Material Protections" at pages 34–35 was followed for Examples 6–9 of Table 2. The test offers an excellent indication of the ability of corrosion inhibitors to protect metals immersed in either sweet or sour fluids. The corrosion current test employed in Examples 1–5 of Table 1 als offers an excellent indication of the ability of corrosion inhibitors to protect metals immersed in sweet fluids only.

The following examples will further illustrate the novel corrosion treating solutions of the present invention containing said polythioethers. These examples are given by way of illustration and not as limitations on the scope of the invention. Thus, it should be understood that materials present in the corrosion treating solutions may be varied to achieve similar results within the scope of the invention.

CORROSION CURRENT TESTS

The polythioethers were evaluated as sweet corrosion inhibitors with an electric current corrosion apparatus. This gave the corrosion potential of the various systems in Examples 1–5 of Table 1. The apparatus is not very effective for evaluating sour corrosion. The procedure employed is disclosed in Mars G. Fontana and Norbert D. Greene, *Corrosion Engineering*, Chapter 10, "Modern Theory-Applications", McGraw-Hill Book Co., St. Louis (2nd ed. 1978). The *Corrosion Engineering* disclosure is herein incorporated by reference.

The polythioethers were evaluated in an acidified, carbon dioxide-purged brine. The carbon dioxide saturated brine was prepared by adding 100 g of sodium chloride, 0.83 gr of calcium chloride ($CaCl_2.2H_2O$), and 0.83 ml of concentrated hydrochloric acid per liter of distilled, deionized water. The working electrode was a polished and degreased shim stock specimen having a weight percentage of 99.19% Fe, 0.23% Mn, 0.14% C, 0.12% N, 0.07% Cr, 0.07% Mo, 0.06% Ni, 0.04% Co, 0.02% P, 0.01% Si, and 0.01% S. The working electrode had an area of one square centimeter.

Tafel plots were obtained using a Princeton Applied Research Model 350 Corrosion Measurement Counsel. A standard saturated calomel electrode and two carbon rods were used as the reference and auxillary electrodes, respectively. All scans were 0.01 mv/second; cathodic to anodic. The corrosion potential, the corrosion current density and the anodic and cathodic Tafel coefficients were determined according to the *Corrosion Engineering* reference.

The sweet (carbon dioxide) corrosion inhibition properties of four hydroxyl-terminated polythioethers were determined according to the above procedure. The polythioethers tested were Permapol® P-820, Permapol® P-855, Permapol® P-900 and Permapol® P-905, all of which are polythioethers sold under the those trademarks by Products Research and Chemical Corp. The four tested polythioethers all fit the general formula disclosed herein, wherein X is believed to be an ethyl radical. On an average basis, three of the R groups ($R^1$, $R^2$, $R^3$, $R^4$) are hydrogen and one of the R groups is methyl ($CH_3$) for all four of the tested polythioethers. It is believed that Permapol® P-820 has an average molecular weight of 1300, Permapol® P-855 has an average molecular weight of 3200, Permapol® P-900 has an average molecular weight of 500 and Permapol® P-905 has an average molecular weight of 1000. It is also believed that n is about 2.8 and 17.9 for Permapol® P-900 and Permapol® P-855, respectively.

EXAMPLE 1

The Permapol® P-820 polythioether was tested alone as a corrosion inhibitor in the carbon dioxide saturated brine. It reduced the corrosion current from $7.2 \times 10^3$ namps/cm$^2$ to $1.2 \times 10^3$ namps/cm$^2$, an 83% reduction in the corrosion rate.

EXAMPLES 2-5

One gram of a polythioether (PERMAPOL® P-820, P-855, P-900, and P-905) were each mixed with 1 g of a fatty amine (Sherex® 551) and 1 g of a fatty ester (WITCO® 213) and blended with 6 g of Texaco EM Fluid® for testing. Table 1 shows that 93% and 94% reductions in the corrosion rate were obtained. These corrosion reductions are equivalent to the corrosion reductions achieveable with the best commercial sweet inhibitor systems available.

TABLE 1

| | Corrosion Current Tests | | |
|---|---|---|---|
| Ex. | Polythioether | Corrosion Current (namps/cm$^2$) | Percent Reduction* |
| 2 | P-820 | — | — |
| 3 | P-855 | 4.4 × 10$^2$ | 94% |
| 4 | P-900 | 4.1 × 10$^2$ | 94% |
| 5 | P-905 | 4.7 × 10$^2$ | 93% |

*Compared to corrosion current in brine without polythioether of 7.2 × 10$^3$ namps/cm$^2$.

CONTINUOUS EXPOSURE TESTS

The metal specimens were immersed in sweet or sour fluid environments for seventy-two (72) hours to approximate continuous exposure conditions in the oil field. The sweet fluid test environment was established by gassing the test solution with carbon dioxide. A sour fluid test environment was created by bubbling hydrogen sulfide through the test solution. The oxygenated brine environment was duplicated with air. The specimens were tested in carbon dioxide, hydrogen sulfide and oxygenated brine environments with and without the claimed thiol esters.

The metal test specimens were cold-rolled, mild steel coupon which measured 3 inches by 0.5 inches by 0.005 inches. These coupons were initially cleaned in order to remove any surface film, dried and then weighed.

Four ounce glass bottles were filled with a fluid which simulated an oil-brine environment. It consisted of 10 milliliters of Texaco EDM fluid, a Texaco trademarked lube oil cut having an API gravity of about 39°, 90 milliliters of a 10% synthetic brine and 1 milliliter of dilute (6%) acetic acid. The synthetic brine contained 10% sodium chloride and 0.5% calcium chloride by weight. The oil-brine test solutions were then gassed for 5 to 10 minutes with carbon dioxide to create a sweet test environment or hydrogen sulfide to create a sour test environment. The solution gassing was designed to remove any dissolved oxygen as well as create the sweet or sour environment.

The stock solution of the polythioether systems tested comprised 1.0 grams of a polythioether, 1.0 grams of Sherex ® 551, 1.0 grams of WITCO Kemester ® 213, 0.06 grams of Texaco M-320, and 6.0 grams of Texaco EM Fluid ®. Texaco M-320 is a trademarked ethoxylated tertiary amine surfactant containing about 20 ethylene oxide groups sold by Texaco Chemical Co. The polythioether stock solutions were added to the 10% oil/90% brine mixtures in the bottles in a 100 ppm concentration.

The steel test coupons were then placed within the bottles. The bottles were capped and mounted on the spokes of a 23 inch diameter, vertically mounted wheel and rotated for 72 hours at 30 rpm inside an oven maintained at 49° C. for H₂S and oxygenated brine environments and 71° C. for CO₂ environment. The coupons were removed from the bottles, washed and scrubbed with dilute acid for cleaning purposes, dried and weighed. The corrosion rate in mils per year (mpy) was then calculated from the weight loss. One mpy is equivalent to 0.001 inches of metal lost per year to corrosion. Additionally, the test coupons were visually inspected for the type of corrosive attack, e.g., hydrogen blistering, pitting and crevice corrosion or general corrosion.

EXAMPLES 6-9

The continuous exposure bottle tests confirmed the corrosion current test results for the polythioether inhibition systems in sweet environments. The bottle tests for all four polythioether systems indicated 93% to 94% protection in a carbon dioxide environment, the same as the corrosion current tests. These corrosion reductions are equivalent to those given by the best available commercial sweet inhibitor systems.

Similar results were achieved in the sour environment of hydrogen sulfide. 97% to 99% corrosion protection was achieved in all four polythioether systems. These results are also equivalent to the corrosion reductions given by the best commercial sour inhibitor systems available. Additionally, no pitting was observed in the sour environment tests.

TABLE 2

| | Continuous Exposure Wheel Tests | | |
|---|---|---|---|
| Ex. | Polythioether | CO₂ | H₂S |
| 6 | P-820 | 1.7 mpy 93% | 1.3 mpy 97% |
| 7 | P-855 | 1.6 mpy 94% | 1.3 mpy 97% |
| 8 | P-900 | 1.4 mpy 94% | 0.7 mpy 99% |
| 9 | P-905 | 1.7 mpy 93% | 0.9 mpy 98% |

TABLE 2-continued

| | Continuous Exposure Wheel Tests | | |
|---|---|---|---|
| Ex. | Polythioether | CO₂ | H₂S |
| | | 93% | 98% |

Other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A water-dispersible corrosion inhibiting solution comprising:
    a solvent; about 2 ppm by volume to about 5% by volume of an amine or a fatty ester; and
    about 10 ppm by volume of a polythioether said polythioether represented by the formula

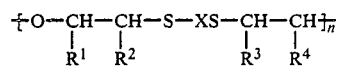

wherein R¹, R², R³ and R⁴ are H, a methyl group or ethyl group, X is a divalent organic radical selected from the group consisting of —C₂H₄—, —C₄H₈—, —C₂H₄SC₂H₄—, and n is about 2 to about 40.

2. The corrosion inhibiting solution of claim 1, wherein the solvent is water.

3. The corrosion inhibiting solution of claim 2, wherein the water is a brine.

4. The corrosion inhibiting solution of claim 1, wherein the solvent is a hydrocarbon.

5. The corrosion inhibiting solution of claim 4, wherein the solvent is an aromatic hydrocarbon solvent.

6. The corrosion inhibiting solution of claim 1, wherein the solvent is an alcohol selected from the group consisting of ethylene glycol, propylene glycol, methanol, ethanol, propanol, butanol, pentanol and mixtures thereof.

7. The corrosion inhibiting solution of claim 1, wherein the solvent is a hydrocarbon and brine mixture.

8. A water-dispersible corrosion inhibiting solution, comprising:
    a hydrocarbon solvent;
    about 10 ppm by volume to about 200 ppm by volume of a polythioether, said polythioether represented by the formula

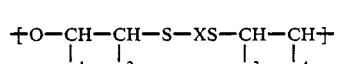

wherein R¹, R², R³ and R⁴ are H, or a methyl group, X is a divalent organic radical of —C₂H₄—, and n is about 2 to about 40;
    about 10 ppm by volume to about 1000 ppm by volume of a fatty amine; and
    about 10 ppm by volume to about 1000 ppm by volume of a fatty ester.

9. A method of protecting metals from corrosive agents in hydrocarbon and aqueous fluids which comprises contacting the metal with an effective amount of a polythioether represented by the formula

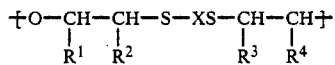

wherein $R^1$, $R^2$, $R^3$ and $R^4$ are H, a methyl group, or an ethyl group, X is a divalent organic radical selected from the group consisting of $-C_2H_4-$, $-C_4H_8-$, and $-C_2H_4SC_2H_4-$, and n is about 2 to about 40.

10. The method of claim 9, wherein the polythioether is mixed with fluids so that a concentration of about 10 ppm by volume about 10% by volume of the polythioether continuously contacts the metal.

UNITED STATES PATENT AND TRADEMARK OFFICE
CERTIFICATE OF CORRECTION

PATENT NO. : 4,759,908
DATED : July 26, 1988
INVENTOR(S) : Michael John Incorvia It is certified that error appears in the above-identified patent and that said Letters Patent is hereby corrected as shown below:

Claim 1, line 5, after "volume" insert --to about 10% by volume--.

Signed and Sealed this

Seventh Day of November, 1989

Attest:

JEFFREY M. SAMUELS

Attesting Officer     Acting Commissioner of Patents and Trademarks